(12) United States Patent
Winters

(10) Patent No.: US 7,751,449 B2
(45) Date of Patent: Jul. 6, 2010

(54) METHOD AND SYSTEM FOR SIMULATION MULTIMEDIA PACKET LOSS AND JITTER

(75) Inventor: Derek Winters, Atlanta, GA (US)

(73) Assignee: ARRIS Group, Inc., Suwanee, GA (US)

( * ) Notice: Subject to any disclaimer, the term of this patent is extended or adjusted under 35 U.S.C. 154(b) by 1100 days.

(21) Appl. No.: 11/395,587

(22) Filed: Mar. 30, 2006

(65) Prior Publication Data

US 2006/0221845 A1 Oct. 5, 2006

Related U.S. Application Data

(60) Provisional application No. 60/666,345, filed on Mar. 30, 2005.

(51) Int. Cl.
*H04J 3/06* (2006.01)
*H04L 12/26* (2006.01)
(52) U.S. Cl. .................................. 370/517; 370/229
(58) Field of Classification Search ............... 370/517, 370/229, 230, 232, 236, 252, 352, 412
See application file for complete search history.

(56) References Cited

U.S. PATENT DOCUMENTS

| | | | |
|---|---|---|---|
| 7,313,635 B1 * | 12/2007 | Zavalkovsky | 709/248 |
| 2002/0085501 A1 * | 7/2002 | Guven et al. | 370/252 |
| 2002/0124096 A1 * | 9/2002 | Loguinov et al. | 709/230 |
| 2003/0212535 A1 * | 11/2003 | Goel | 703/2 |
| 2004/0114602 A1 * | 6/2004 | Ko et al. | 370/395.4 |
| 2005/0169186 A1 * | 8/2005 | Qiu et al. | 370/242 |
| 2006/0104313 A1 * | 5/2006 | Haner et al. | 370/517 |
| 2006/0126529 A1 * | 6/2006 | Hardy | 370/252 |

* cited by examiner

*Primary Examiner*—Ricky Ngo
*Assistant Examiner*—Clemence Han
(74) *Attorney, Agent, or Firm*—Troy A. Van Aacken; Robert J. Starr

(57) ABSTRACT

A Packet Loss and Jitter Simulator processes RTP packets coming through the MTA. Based on user input commands, the simulator drops or delays insertion of packets into the DSP portion of the MTA. Various modes that may be programmed include, but are not limited to, manual packet loss, fixed packet loss, random packet loss, manual jitter, fixed jitter, shift jitter, burst jitter, random jitter, and rolling jitter. All of these modes can be modified to simulate many real world conditions. The simulator typically operates on downstream packets, but can be used to provide similar functionality in the upstream direction.

11 Claims, 3 Drawing Sheets

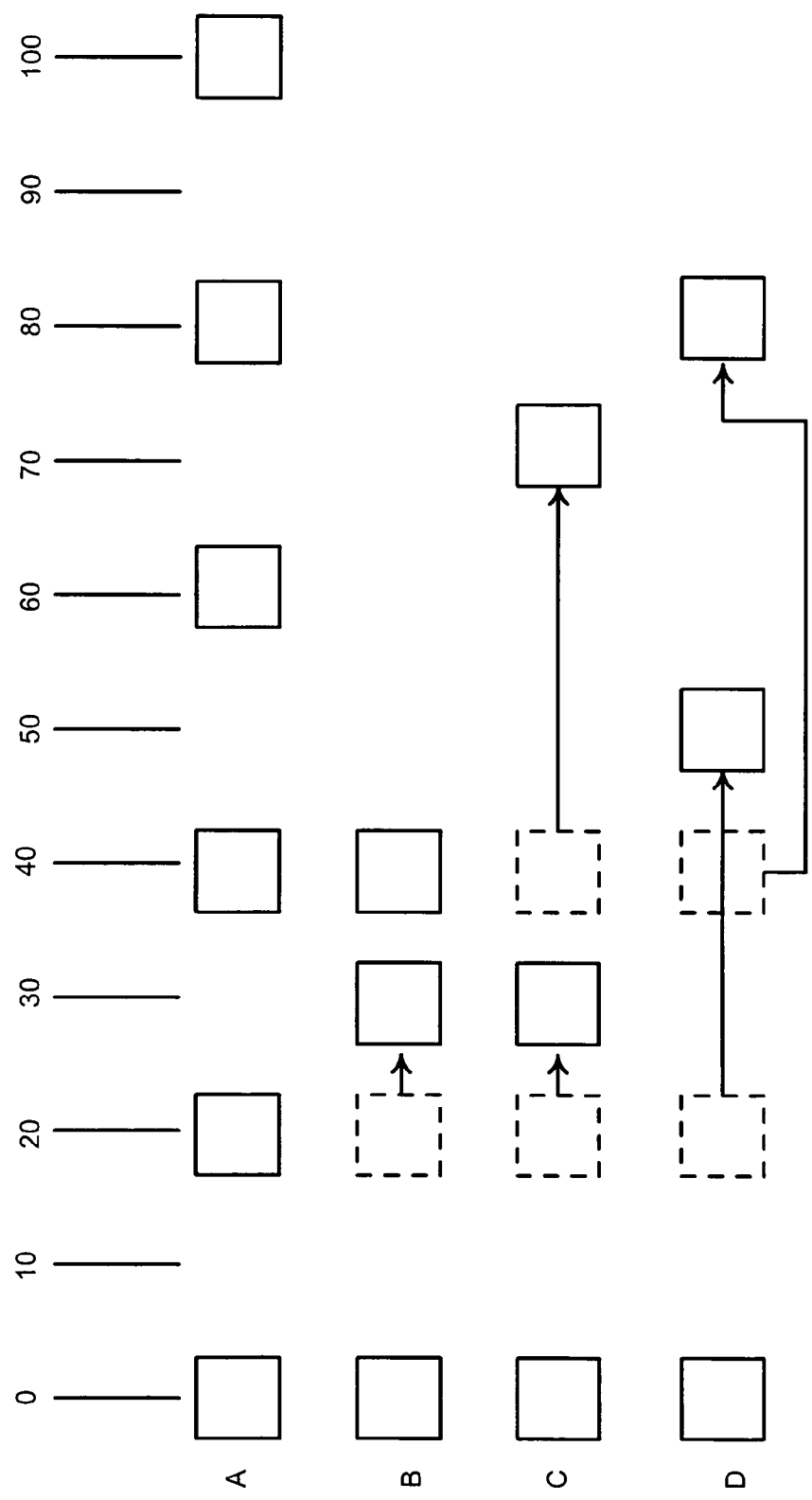

METHOD AND SYSTEM FOR SIMULATION MULTIMEDIA PACKET LOSS AND JITTER

CROSS REFERENCE TO RELATED APPLICATION

This application priority under 35 U.S.C. 119(e) to U.S. provisional patent application No. 60/666,345 entitled "EMTA VoIP packet loss and jitter simulator," which was filed Mar. 30, 2005, and is incorporated herein by reference in its entirety.

FIELD OF THE INVENTION

The present invention relates generally to communication devices, and more particularly to testing of media terminal adaptors and related equipment.

BACKGROUND

Cable data systems are used to allow cable TV subscribers to use the Hybrid-Fiber-Coax (HFC) network as a communication link between their home networks and the Internet. As a result, computer information (Internet Protocol packets) can be transmitted across the Hybrid-Fiber-Coax network between home computers and the Internet. The DOCSIS specification (defined by CableLabs) specifies the set of protocols that must be used to effect a data transfer across the Hybrid-Fiber-Coax network. Two fundamental pieces of equipment permit this data transfer: a cable modem (CM) which is positioned in the subscriber's home, and a Cable Modem Termination System (CMTS) which is positioned in the head end of the cable TV company.

In addition to data traffic, subscribers are more and more obtaining telephony voice services over networks other than the traditional public switched telephony network ("PSTN"). A multiple services operator ("MSO") may provide such telephony services, in addition to data over cable service via DOCSIS. For example, CableLabs has established the PacketCable standard for providing telephony services over cable. A subscriber typically has a device that includes a DOCSIS cable modem for transmitting and receiving data and a media terminal adaptor ("MTA") for processing voice traffic for transmission and reception over cable.

Subscribers from time to time may experience degraded service in the field due to packet loss and jitter. To evaluate and correct such degradation, equipment vendors may need to reproduce the jitter and packet loss conditions in a lab to facilitate determining and counteracting the cause of the degradation. However, standard network impairment test equipment is costly Thus, there is need for a method and system for simulating network impairments for testing field scenarios on an MTA that is lest costly than purchasing and using standard network impairment equipment

SUMMARY

Impaired network conditions are simulated by dropping packets or applying delay to packets in a flow having a nominal packet rate. A packet of the flow is received into a queue. A delay amount for holding the packet in the queue is calculated based on an impairment condition command input with an interface and based on the current delay variable. The current delay variable value is determined based on its value of and the delay amount determined for the previous packet in the flow. The packet is released from the queue after the calculated delay amount value has elapsed in reference to the release of the immediately previous packet.

BRIEF DESCRIPTION OF THE DRAWINGS

FIG. 3 illustrates some packet delay scenarios.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
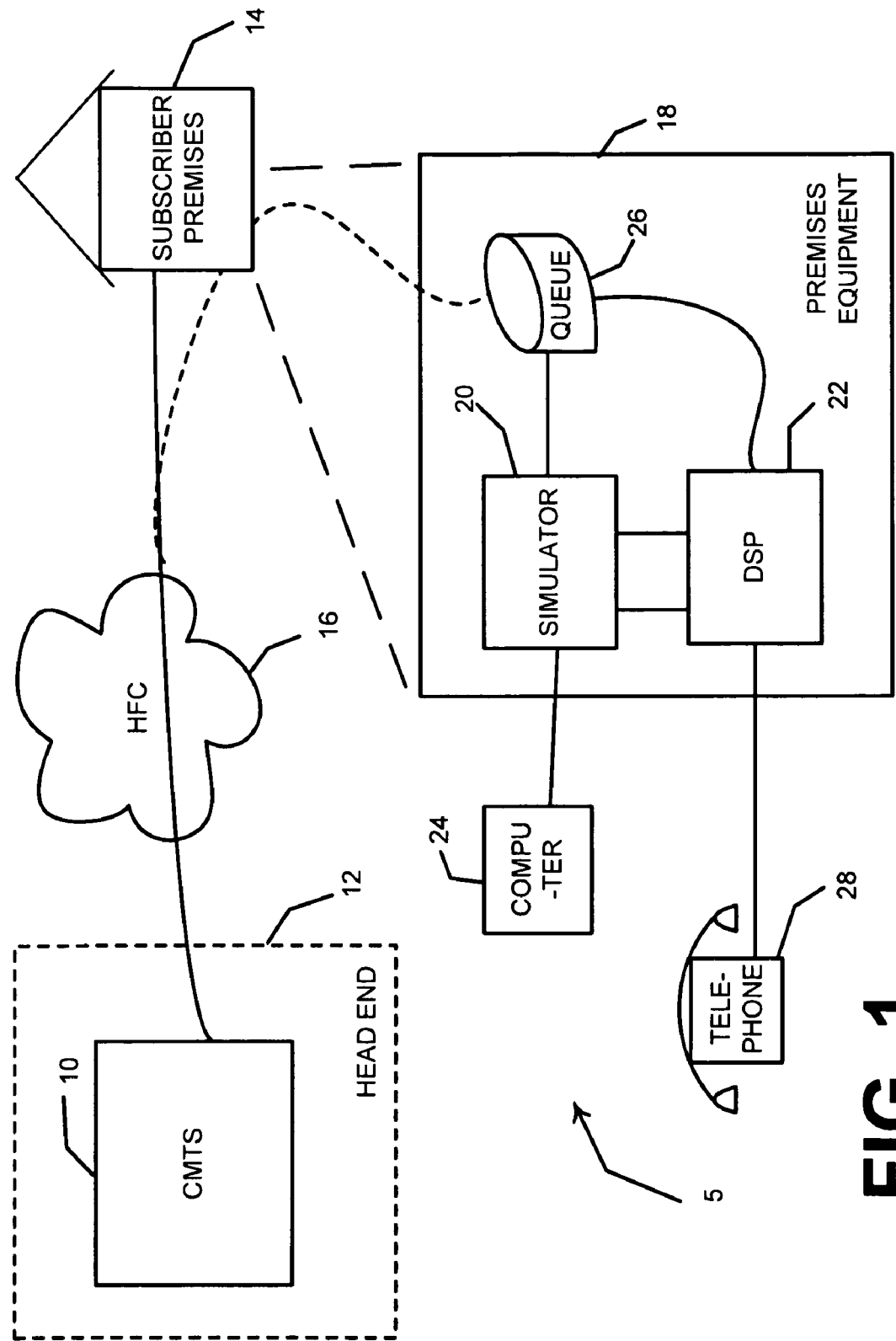
FIG. 1 illustrates a network diagram showing a loss/jitter simulator between an MTA device and an HFC.

Turning now to the figure, FIG. 1 illustrates a network diagram showing a system 5 for using a loss/jitter simulator between an MTA device and an HFC. A CMTS 10 located at head end 12 transmits downstream voice packets towards a subscriber's premises 14 across HFC 16. At the subscriber's premises 14, the subscriber typically uses premise equipment 18 that includes cable modem ("CM") circuitry and MTA circuitry for processing packets carrying voice signals. A simulator 20 is installed between packet queue 26 and DSP 22. Simulator 20 may be coupled to computer 24, or similar device, for providing command and control functionality over the simulator. Simulator 20 is preferably a software application that intercepts packets from queue 26 and processes them as needed to induce delay and jitter. A user sends and receives voice information using telephone 28.

It will be appreciated that the use of simulator 20 is in the laboratory environment, and system 5 is illustrated showing the logical position of the where the simulator with respect to the network. However, simulator 20 may be located in the device 18 as shown, or external to the customer device (cable modem/MTA).

Figure 2:
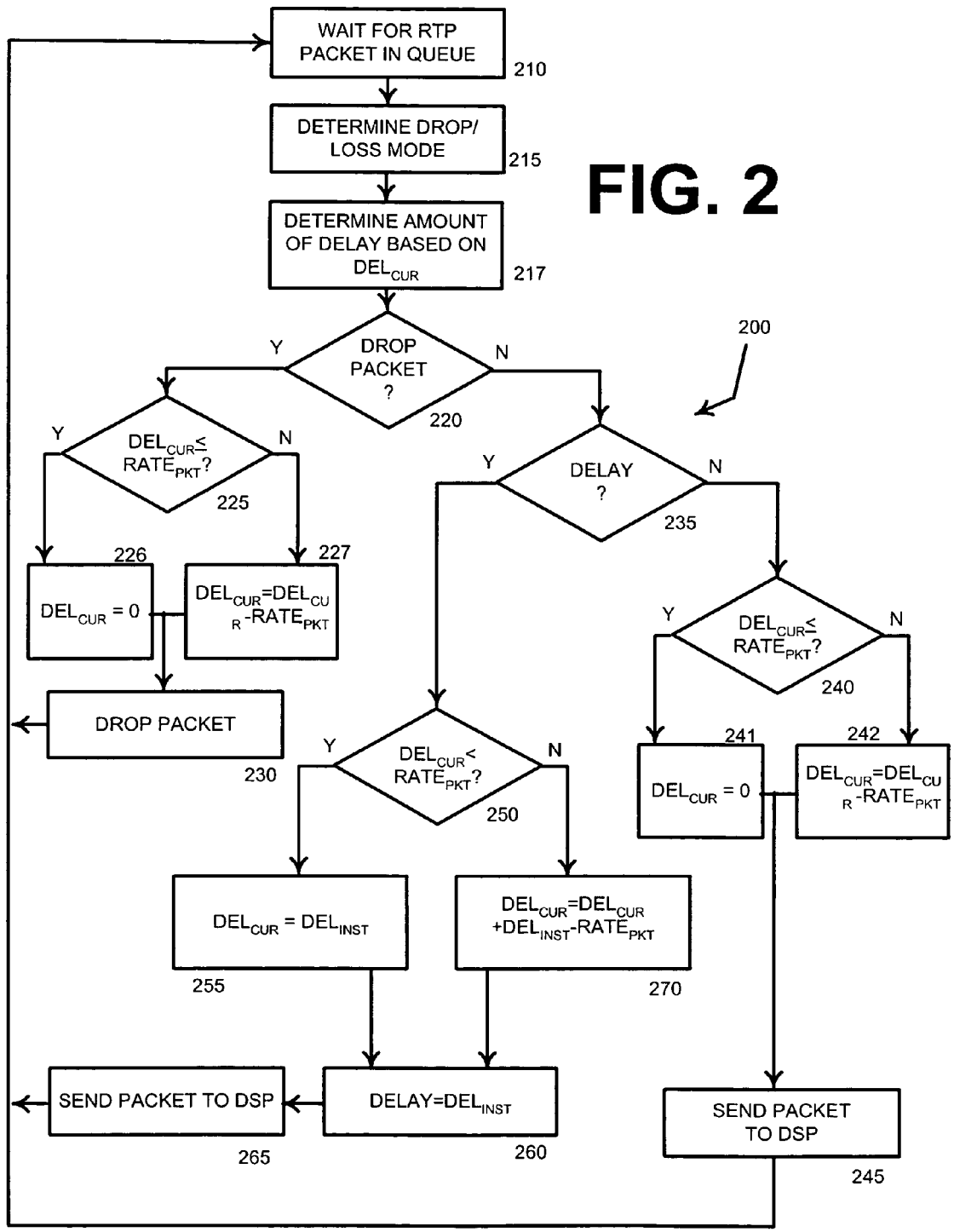
FIG. 2 illustrates a flow diagram of a method for simulating packet loss and/or jitter packets reach an MTA.

Turning now to FIG. 2, a flow diagram of a method 200 is illustrated showing a process for simulating the effects on packets in a network of certain network conditions. The simulator process waits on packets and receives them at step 210. The packets may be part of a stream of packets containing voice/telephony information over a protocol, such as, for example, Real Time Protocol ("RTP"). At step 215, the simulator determines what condition, or conditions, is/are to be simulated by inducing loss or jitter into the flow of packets by dropping packets or delaying packets, respectively, according to a predetermined command. It will be appreciated that a combination of loss and or jitter may be induced, and the loss and jitter modes include a variety of loss/jitter conditions. The current packet is stored to queue 26 shown in FIG. 1 to await processing according to the simulation operation to be carried out based on a user input command.

A command may be input to the simulator using a computer device coupled to the simulator. Typically, a command line interface accepts command input from a user and controls the simulator in response to the command. Examples of the loss/jitter conditions that may be implemented by the simulator include instant, fixed or random loss modes, and instant, fixed, shift, burst, random, or rolling modes.

It is noted that jitter conditions that are input at step 215 may be of a recursive nature and that some knowledge of previous states may be used to calculate at step 217 an amount of delay $DEL_{INST}$ to apply to a packet to simulate various impairment condition scenarios. For a given iteration through method 200, the current time delta $DEL_{CUR}$ between actual packet insertion and nominal packet insertion is used at step 217.

If the condition to test is for dropped packets, a determination is made at step 220 that a packet is to be dropped. The process follows the 'Y' path at step 220, and the current delay amount $DEL_{CUR}$ is adjusted at step 225. If $DEL_{CUR}$ is less than or equal to the current packet rate then $DEL_{CUR}$ is adjusted to zero at step 226 (a typical packet rate is one packet every 20 milliseconds). If $DEL_{CUR}$ is greater than the period corresponding to the current packet rate then the current packet rate period is subtracted from $DEL_{CUR}$ in step 227. Thus, for example, if the nominal packet rate is one packet per 20 milliseconds, then a delay amount of 20 ms is subtracted from $DEL_{CUR}$ and is stored for later use. The packet stored in queue 26 is 'dropped' at step 230 by clearing it from queue 26, which receives another packet at step 210. It will be appreciated that the delay value variable $DEL_{CUR}$ is adjusted at step 226 or 227 for potential use on the next iteration at step 217.

Continuing with the description of FIG. 2, if the condition to be simulated does not require that a packet be dropped, the 'N' path from step 220 is followed to step 235. At step 235, a determination is made whether to induce additional delay (delay may already have been introduced during a prior iteration of method 200; thus, additional delay may not be needed). If, according to user input commands, no additional instantaneous delay needs to be induced, the current total delay $DEL_{CUR}$ variable is adjusted at step 240. If $DEL_{CUR}$ is less than or equal to the current packet rate then $DEL_{CUR}$ is adjusted to zero at step 241 (typical packet rate is one packet every 20 milliseconds). If $DEL_{CUR}$ is greater than the current packet rate then the current packet rate is subtracted from $DEL_{CUR}$ in step 242. The packet is then sent to the DSP to be processed at step 245. Following step 245, process 200 returns to step 210 to receive another packet.

If at step 235 a determination is made that delay should be added to the current packet to simulate a condition as requested by user input, process 200 follows the 'Y' path at step 235. At step 250, a determination is made whether the current value of delay $DEL_{CUR}$ is less than the packet rate. If yes, process 200 follows the 'Y' path and the current delay $DEL_{CUR}$ is set equal to the desired instantaneous delay $DEL_{INST}$ at step 255. At step 260 the packet is delayed for the amount of desired instantaneous delay, which is $DEL_{INST}$. Following the delay the packet is then sent to the DSP to be processed at step 265. Process 200 returns to step 210 to receive additional packets.

If at step 250 the current delay variable value $DEL_{CUR}$ is determined to be greater than or equal to the current packet rate, the process follows the 'N' path to step 270. At step 270, the current delay $DEL_{CUR}$ is set equal to the existing delay variable value $DEL_{CUR}$ plus the desired amount of instant delay to be applied to the packet $DEL_{INST}$ minus the packet rate $RATE_{PKT}$ to arrive at a new value for variable $DEL_{CUR}$. This formula that is applied at step 270 allows process 200 to always keep accurate track of the delta between when a packet would have nominally been delivered, based on the network system packet rate, to the DSP and when it actually will be delivered. The process continues to step 260, where the desired instantaneous delay is applied to the current packet by delaying it by an amount equal to the $DEL_{INST}$ before the packet is sent to the DSP at step 265. Process 200 returns to step 210 to receive additional packets as described above.

It will be appreciated that the variable $DEL_{CUR}$ is tracked for a few reasons. One reason is to prevent the queue from becoming full and overflowing due to large delay values. For example, if a long term jitter algorithm has been applied in step 217 then a situation could present itself where queue 26 has no more free space left. By accurately tracking $DEL_{CUR}$, method 200 may partially or fully purge the queue when and if such a situation is reached. Likewise, $DEL_{CUR}$ can also be used to implement more complex jitter algorithms that may need to track a total delta from nominal packet delivery.

For example, if a particular algorithm wanted to shift a group of packets for a user-specified amount of time, release the built-up packets in the queue caused by the initial shift, and then start another delay cycle, the $DEL_{CUR}$ is used. It is useful during each iteration of process 200 to decide when to implement a specific instantaneous delay for that cycle or when to release built-up packets with no delay. Accordingly, if a packet is to be dropped or no delay is to be inserted, as long as the current delay value is less than the packet rate, $DEL_{CUR}$ is set to zero. If the value $DEL_{CUR}$ is greater than the packet rate, then it is adjusted down by the current packet rate to account for the current packet being processed. If delay is to be inserted, as long as the current delay value is less than the packet rate, $DEL_{CUR}$ is set to $DEL_{INST}$. If the value $DEL_{CUR}$ is greater than the packet rate, the formula shown in step 270 is followed. This normalizing of the total current packet delivery delay to the DSP ensures that the desired amount of delay is properly applied to the next packet.

Use of the $DEL_{CUR}$ value is shown in FIG. 3. The legend across the top of FIG. 3 indicates 10 ms increments. Scenario A shows a normal flow of packets at a 20 ms packet rate. In scenario B, a desired 10 ms instantaneous delay is induced to the second packet. Thus, $DEL_{CUR}$=10 ms.

Scenario C shows a 10 ms delay to the second packet as in scenario B, and a desired 30 ms delay to the third packet. Accordingly, because 10 ms<20 ms, the 30 ms delay to the third packet is applied to the packet's normal arrival time of 40 ms, and the third packet is delivered at T=70 ms. In scenario C, $DEL_{CUR}$=0 ms after the first packet is processed, $DEL_{CUR}$=10 ms after the second packet is processed ($DEL_{CUR}$=$DEL_{INST}$=10 ms), and $DEL_{CUR}$=30 ms after the third packet is processed ($DEL_{CUR}$=$DEL_{INST}$=30 ms).

Scenario D shows the outcome if the 'N' path from step 250 is followed. This time a 30 ms delay ($DEL_{INST}$) is added to the second and third packets. In scenario D, $DEL_{CUR}$=0 ms after the first packet is processed, $DEL_{CUR}$=30 ms after the second packet is processed ($DEL_{CUR}$=$DEL_{INST}$=30 ms), and $DEL_{CUR}$=40 ms after the third packet is processed ($DEL_{CUR}$=$DEL_{CUR}$+$DEL_{INST}$-$RATE_{PKT}$). If after delivery of this third packet at the 80 ms mark the specific jitter procedure instructs a return to a nominal packet injection state, the next two packets could be instantly released from queue 26 to return to $DEL_{CUR}$=0 ($DEL_{CUR}$=$DEL_{CUR}$-$RATE_{PKT}$-$RATE_{PKT}$=0).

The above scenarios depict some simple examples of how to track the current delay for a specific packet. Without this tracking mechanism, implementing complex recursive jitter procedures in step 217 becomes very difficult.

Below is a summary of some possible modes of degradation that may be introduced into a packet stream by simulator 20, as shown in FIG. 1:

Loss Modes:
Instant only: Drop the next X packets as soon as they enter the tool. Can be used to implement specific instantaneous dropped packet scenarios.
Fixed mode: Drop X sequential packets every Y milliseconds.
Random mode: Drop X percentage of packets psuedo-randomly.

Jitter Modes:
Instant only: Delay the next packet by the specified time
Fixed Mode: Oscillating delay of time X ms.
Shift Mode: Shift a group of evenly spaced packets by X ms for a specified percentage Y of each second.
Burst Mode: Insert a constant delay of time X ms between packets for a specified percentage Y of each second.
Random Mode: Insert a psuedo-random max delay of X ms for a psuedo-random max percentage Y of each second.
Rolling Mode: Increase the inter-packet delay by delta X ms up to an upper-bound then burst the remaining queued packets. Also done for a percentage Y of each seconds.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for simulating impaired packet conditions in a packet flow having a flow rate, the method comprising:
    receiving a first packet of the packet flow into a queue;
    receiving a second packet of the packet flow into the queue, the first packet directly preceding the second packet, wherein timing of reception of the first packet and the second packet is related to the flow rate;
    calculating a delay amount ($DEL_{INST}$) to retain the second packet in the queue based on an impairment condition command and based on a current delay variable ($DEL_{CUR}$), wherein the current delay variable ($DEL_{CUR}$) is determined based at least upon values of $DEL_{CUR}$ and $DEL_{INST}$ for the first packet; and
    releasing the second packet from the queue after the calculated delay amount ($DEL_{INST}$) has elapsed in reference to the releasing of the first packet from the queue;
    wherein the current delay variable is set equal to the delay amount if the current delay variable is less than a time related to the flow rate of the packet flow.

2. The method of claim 1 further comprising determining a modification to a second device that receives the packet flow over a network from a first device, the modification reducing effects on the second device responsive to network conditions causing an impairment of packet flow that is similar to conditions simulated according to the current delay variable.

3. A method for simulating impaired packet conditions in a packet flow having a flow rate, the method comprising:
    receiving a first packet of the packet flow into a queue;
    receiving a second packet of the packet flow into the queue, the first packet directly preceding the second packet, wherein timing of reception of the first packet and the second packet is related to the flow rate;
    calculating a delay amount ($DEL_{INST}$) to retain the second packet in the queue based on an impairment condition command and based on a current delay variable ($DEL_{CUR}$), wherein the current delay variable ($DEL_{CUR}$) is determined based at least upon values of $DEL_{CUR}$ and $DEL_{INST}$ for the first packet;
    releasing the second packet from the queue after the calculated delay amount ($DEL_{INST}$) has elapsed in reference to the releasing of the first packet from the queue;
    wherein the current delay variable is set based on a normalized delay for a previously delayed packet in the packet flow; and
    wherein the normalized delay is based at least on a difference between a calculated value of the current delay variable for the first packet and a time related to the flow rate.

4. The method of claim 3 wherein the current delay variable is set to a calculated value of the current delay variable that was applied to the first packet in the packet flow plus the delay amount to be added to the second packet minus a time related to the flow rate.

5. A method for simulating impaired packet conditions in a packet flow from a first device to a second device over a network, the method comprising:
    receiving a first packet from the first device;
    receiving a second packet from the first device, the second packet directly following the first packet in the packet flow, wherein timing of reception of the first packet and the second packet is related to a flow rate of the packet flow;
    calculating a delay amount ($DEL_{INST}$) to apply to the second packet based on an impairment condition command and based on a current delay variable ($DEL_{CUR}$), wherein the current delay variable is determined based on a value of the delay amount ($DEL_{INST}$) corresponding to the first packet of the packet flow; and
    processing the second packet according to the impairment condition command;
    wherein the current delay variable is set to the delay amount if the current delay variable is less than a time related to the flow rate of the packet flow.

6. The method of claim 5 wherein the impairment condition command is to drop the second packet from the packet flow.

7. The method of claim 5 wherein the impairment condition command is to delay delivery of the second packet.

8. The method of claim 7 wherein the current delay variable is set based on a normalized delay for a previously delayed packet in the packet flow.

9. The method of claim 8 wherein the normalized delay is based at least on a difference between a calculated value of the current delay variable for the first packet and a time related to the flow rate.

10. The method of claim 8 wherein the current delay variable is set to a calculated value of the current delay variable that was applied to the first packet in the packet flow plus the delay amount to be added to the second packet minus a time related to the flow rate.

11. The method of claim 5 further comprising determining a modification to the second device that reduces effects thereto responsive to network conditions causing an impairment of packet flow that is similar to conditions simulated according to the current delay variable.

* * * * *